(12) United States Patent
Harms et al.

(10) Patent No.: US 12,627,773 B2
(45) Date of Patent: May 12, 2026

(54) DATA ACQUISITION AND DISSEMINATION PLATFORM

(71) Applicant: Trinity Innovative Solutions, LLC, Little Elm, TX (US)

(72) Inventors: Dwight David Harms, The Colony, TX (US); Timothy Francis Hall, The Colony, TX (US)

( * ) Notice: Subject to any disclaimer, the term of this patent is extended or adjusted under 35 U.S.C. 154(b) by 25 days.

(21) Appl. No.: 18/229,387

(22) Filed: Aug. 2, 2023

(65) Prior Publication Data

US 2023/0412773 A1 Dec. 21, 2023

Related U.S. Application Data

(63) Continuation of application No. 17/507,164, filed on Oct. 21, 2021, now Pat. No. 11,736,664, which is a
(Continued)

(51) Int. Cl.
 *H04N 7/18* (2006.01)
 *G06V 20/62* (2022.01)
 (Continued)

(52) U.S. Cl.
 CPC ............. *H04N 7/183* (2013.01); *G06V 20/62* (2022.01); *H04N 23/50* (2023.01); *H04W 4/80* (2018.02)

(58) Field of Classification Search
 CPC ........ H04N 7/183; H04N 23/50; G06V 20/62; H04W 4/80; H04W 4/02
 See application file for complete search history.

(56) References Cited

U.S. PATENT DOCUMENTS 5,497,214 A * 3/1996 Labree ................... F16M 11/08
 396/428
5,689,442 A 11/1997 Swanson et al.
 (Continued)

FOREIGN PATENT DOCUMENTS

WO 2010146572 A1 12/2010

OTHER PUBLICATIONS

Wasserstein, "Wasserstein 2-in-1 Universal Pole Mount for Camera & Solar Panel . . . ," dated using WaybackMachine to Sep. 26, 2021; URL: https://web.archive.org/web/20210926165703/https://wasserstein-home.com/products/wasserstein-2-in-1-universal-pole-mount-for-camera-solar-panel (Year: 2021).*
(Continued)

*Primary Examiner* — William C Vaughn, Jr.
*Assistant Examiner* — Tyler B Edwards
(74) *Attorney, Agent, or Firm* — J. Andrew Reed; Think Differently Legal, PLLC

(57) ABSTRACT

An apparatus and system for surveillance via an imaging system within an enclosure. The enclosure is capable of being mounted to any number of locations such as light poles, power poles, buildings, awnings, and overhangs. The imaging system is capable of recording to local storage, provide live images or also transmitting lower quality images or video clips based on additional sensors such as motion sensors. The imaging system can transmit the images or video clips over a network connection that can include cellular or other wired or wireless connectivity. The apparatus and system can be powered by any number of sources including AC, DC, solar and wind energy.

20 Claims, 10 Drawing Sheets

Related U.S. Application Data continuation of application No. 15/919,825, filed on Mar. 13, 2018, now Pat. No. 11,184,588.

(51) Int. Cl.
  *H04N 23/50*     (2023.01)
  *H04W 4/80*     (2018.01)

(56)        References Cited

U.S. PATENT DOCUMENTS

| | | | | |
|---|---|---|---|---|
| 6,185,303 | B1 * | 2/2001 | Losey ................... | A47B 96/06 |
| | | | | 379/453 |
| 8,564,497 | B1 * | 10/2013 | Dickie .................. | H01Q 21/08 |
| | | | | 343/890 |
| 8,890,954 | B2 | 11/2014 | O'Donnell et al. | |
| 9,826,128 | B1 * | 11/2017 | Ballard ............ | G08B 13/19632 |
| 11,184,588 | B2 | 11/2021 | Harms et al. | |
| 2002/0186148 | A1 | 12/2002 | Trajkovic et al. | |
| 2003/0174865 | A1 | 9/2003 | Vernon | |
| 2005/0244033 | A1 | 11/2005 | Ekin et al. | |
| 2009/0308994 | A1 * | 12/2009 | Moore ................... | A22B 5/06 |
| | | | | 452/185 |
| 2013/0294643 | A1 | 11/2013 | Fan et al. | |
| 2014/0112537 | A1 | 4/2014 | Frank et al. | |
| 2014/0313406 | A1 * | 10/2014 | Becker .................. | H04N 5/907 |
| | | | | 348/374 |

OTHER PUBLICATIONS

Lepelstat Crafts, "Episode 4—Building a French Cleat Camera Mount", YouTube video URL: https://www.youtube.com/watch?v=k3s_PxHoXtw, Published Nov. 23, 2015 (Year: 2015).

\* cited by examiner

*300*

326E   306   308   310   326D

*332*

340

338A

*302*

322   324A

338B

*303*

324B

342

*304*

305

400

406   408   426B

426C 410   426E   448C 426D   448B   *402*

448A   452B   450B

450A   *453*   448E

452A   *446*   444

448D   452C   452D   450D 450C   448G

451

448F

DATA ACQUISITION AND DISSEMINATION PLATFORM

CROSS-REFERENCE TO RELATED APPLICATIONS

This application is a continuation application of U.S. Non-Provisional application Ser. No. 17/507,164, filed Oct. 21, 2021, which is a continuation application of U.S. Non-Provisional application Ser. No. 15/919,825, filed Mar. 13, 2018, the disclosure of which is incorporated herein by reference.

BACKGROUND

Technical Field

The present disclosure relates to a data acquisition and dissemination system. More particularly, and not by way of limitation, the present disclosure is directed to a system and apparatus for a data acquisition and dissemination system for use in remote and populated locations.

Description of Related Art

Video surveillance systems have been around for many years but there are many flaws that must be addressed when a video surveillance system is to be used in a remote location. These remote locations could include along telephone and light poles in parts of a city or town that has a higher crime rate, or location such as a road intersection where accidents frequently occur. Locations such as these often can have little to no cellular signals (3G, 4G, or LTE, or other cellular signals), or other data transmission signals such as wireless local area network ("WLAN" or Wi-Fi").

Current video surveillance systems require the video surveillance system to store the video locally or transmit it live to a central observance and storage location, i.e., a central police or monitoring station. Alternatively, current systems require an office or other individual to service, remove, or download the recorded and capture surveillance data for analysis. Thus, current systems require high costs in data transmission or high costs in manpower.

It would be advantageous to have a system and apparatus for video surveillance that overcomes the disadvantages of the prior art. The present invention provides such a system and apparatus.

BRIEF SUMMARY

The present disclosure is a surveillance system and apparatus that will allow law enforcement, government agencies, commercial businesses, and concerned individuals the ability to capture and monitor surveillance audio, video, and images remotely in a live, semi-live, or delayed playback mode.

Thus, in one aspect, the present disclosure is directed to a system and apparatus that allow for Edge Recording, or remote connection to monitor and analyze locally stored surveillance data.

In another aspect, the present disclosure is directed to an ability to quickly and efficiently change out camera systems to allow for specific recording abilities. Such as, but not limited to, higher resolution imaging, stronger or higher magnification imaging, night vision, 4K imaging, and infrared imaging. Additionally, the present disclosure may also be able to perform License Plate Recognition ("LPR"), stop or red light violations, and/or speeding violation.

In another aspect, the present disclosure is directed to an ability to utilize a multitude of sensors or data acquisition devices, manners, and means to gather data and information from the surveillance location. Some of the multitude of sensors or data acquisition devices, manners, and means to gather data and information can include motion detectors, radar or speed detection sensors, LPR reader, line detection, face detection, shot or audio capture, and/or infrared light projection, laser tripwire or other forms of analog or digital trip or line break sensors.

In yet another aspect, the present disclosure is directed to utilize not only cellular data transmission systems but also WLAN, LAN, mesh networks, and other communications systems such as satellite, Global Positioning System ("GPS"), or other systems.

Additionally, in another aspect, the present disclosure is directed to the utilization of an on-board computer for the capture or acquisition, analysis, and/or dissemination of captured, acquired, and/or analyzed data.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1A:
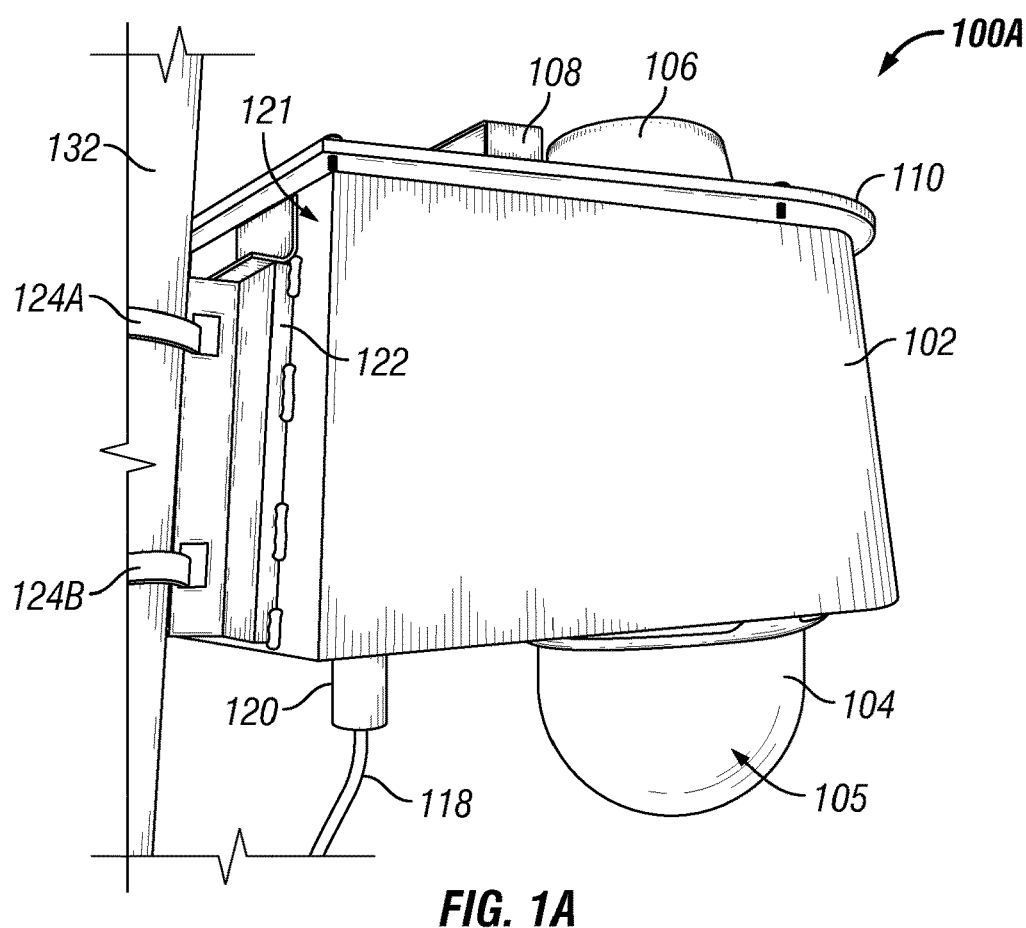
FIG. 1A is a lower perspective view of a fixed surveillance box.
Figure 1B:
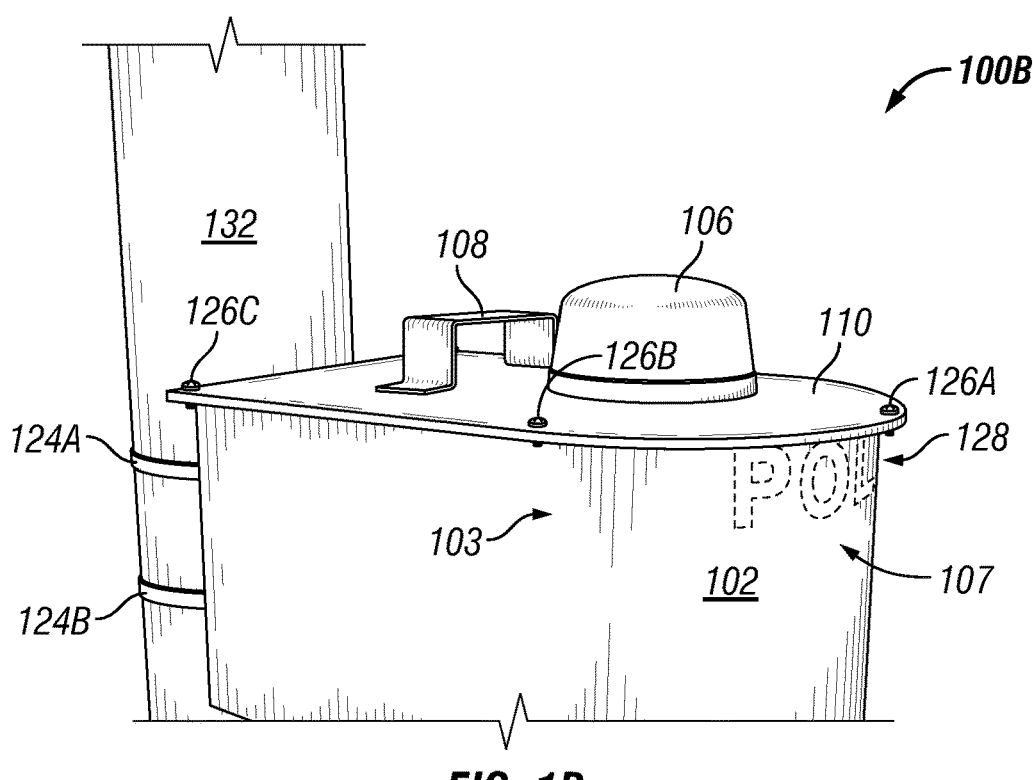
FIG. 1B is an upper perspective view of a fixed surveillance box.

An embodiment of the disclosure will now be described in the present disclosure. FIG. 1A is a lower perspective view 100A, and FIG. 1B is an upper perspective view of a fixed surveillance box 102.

It would be understood that the fixed surveillance box 102 is an enclosure that provides a protective environment for electronic surveillance equipment. The enclosure that is the fixed surveillance box 102 can be any number of shapes, including but not limited to, a square, sphere, cylinders, polygons, ellipses, crescents, cubes, cuboids, ellipsoids, cones, prisms, pyramids, or combinations thereof. It should be noted that these shapes and cross sections would include variations in length, width, number of sides, and other dimensional units or measurements, e.g., triangular and hexagonal prisms would be encompassed by the description above, as well as triangular or square-based pyramids. The enclosure could also be made out of many different materials, including but not limited to, metal, aluminum, plastic, wood, composites, or any combination thereof. The manufacturing process could include but is not limited to, casting, welding, press fitting, bending, adhesives, additive, subtractive, 3D printing, molding, fastening, straps, cord, threads, or any combinations thereof.

An imaging system 104, which can include, but is not limited to, video or still imaging camera system, can be mounted along any of the surfaces of the fixed surveillance box 102. For example, in alternative embodiments the imaging system 104 may be placed alone any one the vertical side surfaces of the fixed surveillance box 102, along with the bottom or top surfaces. The imaging system 104, allows for imaging cameras or sensors to be replaced or changed with relative ease utilizing quick connect and disconnect systems and adaptors that allow, but is not limited to, communications to and from, power, storage, communications, and processing systems to interfacing with the imaging system 104. Replacement or additional imaging cameras or sensors could include, but are not limited to, standard definition, standard high definition (720p and up), higher resolution systems (such as 4K, 8K etc.), increased or higher magnification or zoom systems, night vision systems, infrared systems, or combinations thereof. Replacement of the imaging system 104 can be completed externally through the removal of a protective covering 105 and/or containment ring (not shown) via fasteners (not shown), or a turn and lock connection. Alternatively, the imaging system 104 could be removed internally via the protective covering 105 and/or containment ring (not shown) that would hold the imagining system in place through an opening (not numbered) in a surface of the fixed surveillance box 102. The imaging system 104, can also include, but is not limited to, a bubble or protective covering 105 for the optical or sensor portion of the imaging system 104. It should be noted that the protective covering 105 can be a portion of many commercially available camera systems, but for certain camera systems additional protection (a second protective covering or a first distal from the camera system protective covering) may be required. It would be understood that a camera or a imaging system could have at least one additional sensor within or on-board, and also the fixed surveillance box 102 would have more than one sensor placed on, attached or within the fixed surveillance box.

The imaging system 104 can include, but is not limited to having, the ability to Pan, Tilt, and/or Zoom ("PTZ"). The ability to provide 360° coverage of location through the imaging system 104, as well as elevations, other areas surrounding the mounting location of the fixed surveillance box 102 allow for the ability to possibly create 3D or three dimensional depictions of the area for reconstruction of events or crimes. Interconnected fixed surveillance boxes or a group of fixed surveillance boxes communicating with each other in a localized area could complete these 3D depictions. The interconnection could happen via a router and/or modem, cellular network, or Bluetooth or other wireless or wired network. Pan or Panning allows for the imaging system 104 to rotate horizontally around a central axis of rotation, wherein the central axis of rotation may be fixed. Tilt or Tilting allows for the imaging system 104 to rotate vertically around a central axis of rotation, wherein the central axis of rotation may be fixed. Zoom, Zooming, or magnification can be done digitally or optically (analog). A digital zoom is often done by interpolating, stretching, or modifying the dimensions of individual pixels of an image, while an optical zoom is a changing of the focal length. A digital zoom will often not be utilized in an optical and digital zoom imaging system until the optical zoom has been completely exhausted.

The protective covering 105 could take many shapes or forms, including but not limited to, glass, plastic, polyvinyl materials, other transparent or transparency like materials, or a combination thereof. The shape of the protective covering 105 could be bubble or one half sphere, however, other geometrical shapes or cross sections could be utilized such as, but not limited to, squares, cylinders, polygons, ellipses, crescents, cubes, cuboids, ellipsoids, cones, prisms, pyramids, or combinations thereof. It should be noted that these shapes and cross sections would include variations in length, width, number of sides, and other dimensional units or measurements, e.g., triangular and hexagonal prisms would be encompassed by the description above, as well as triangular or square-based pyramids.

Much like the protective covering 105, the opening cover 106 can take many shapes or forms, including but not limited to, glass, plastic, polyvinyl materials, other transparent or transparency like materials, or a combination thereof. The shape of the opening cover 106 could be bubble or one-half sphere, however, other geometrical shapes or cross sections could be utilized such as, but not limited to, cylinders, polygons, ellipses, crescents, cubes, cuboids, ellipsoids, cones, prisms, pyramids, or combinations thereof. It should be noted that these shapes and cross sections would include variations in length, width, number of sides, and other dimensional units or measurements, e.g., triangular and hexagonal prisms would be encompassed by the description above, as well as triangular or square-based pyramids. The opening cover 106 can be utilized to create additional space for elongated imaging systems, allow for a communication antennae to reach through or outside the fixed surveillance box 102 structure, or for additional imaging systems with upward views for surveillance of tall or multi-floor buildings or for unauthorized aerial vehicle surveillance (e.g., at airports looking for unauthorized drones). The opening cover 106 could also allow for at least one sensor, such as but not limited to, License Plate Recognition ("LPR"), stop or red light violation detection, and/or speeding violation detection, motion sensors or detectors, radar or speed detection sensors, LPR reader(s), line detection, face detection, weather related sensors such as temperature, humidity, wind, photocell, shot or audio capture (microphone), and/or infrared light projection, laser tripwire or other forms of analog or digital trip or line break sensors, or any combination thereof.

Along the upper or top of the fixed surveillance box 102, a handle 108 can be placed that would allow a person to move or carry the fixed surveillance box 102 with relative ease. In addition, for the fixed surveillance box 102 that has a removable upper plate or top 110 the handle 108 also allows a person to easily remove the upper plate or top 110 from the fixed surveillance box 102. It would be understood that the upper plate or top 110 can be of many shapes and sizes, and could encompass an upper plate or top 110 that covers the whole or a smaller portion than the whole of the internal opening of the fixed surveillance box 102. The top 110 or handle 108 can include many different shapes and sizes. The top or upper plate 110 may also in alternative embodiments have a turn down or lip that can prevent water or weather from entering the internal portions of the fixed surveillance box 102. The top or upper plate 110 may also have an insulation coating or material added to reduce heat from a summer sun, or in a winter storm help to maintain a stable operating temperature for the electronic components. The handle 108 could be rounded, flat, cylindrical in cross section, and could have various angles and openings sizes between the top 110 and the handle portion 108. The handle 108, may also be removably connected to the upper plate or top 110.

In alternative embodiments, the side mounting bar (not shown) can be, but is not required to be, mirrored on multiple sides of the fixed surveillance box 102. The side mounting bar can be utilized with an attachment fastener (not shown) (i.e., a nut or wingnut), and/or a fastener (not shown) (i.e., a threaded bolt, or screw). The mounting bar allows for the adjustment of internal components and plates (not shown) in a fixed surveillance box 102 that has a non-adjustable outer size. Alternatively, the side mounting bar, in combination with the attachment fastener, and the fastener could in an adjustable size version of the fixed surveillance box 102 allow for the adjustment of the outer and internal size of the fixed surveillance box 102. For example, the lower portion of the fixed surveillance box 102 could be lowered from upper portion of the fixed surveillance box 102 to increase by approximately double the internal and external size of the fixed surveillance box 102. The lower portion of the fixed surveillance box 102 could include a set of vertical walls and a bottom of the fixed surveillance box 102, while the upper portion of the fixed surveillance box 102 could include the top and a set of vertical walls of the fixed surveillance box 102.

Power can be provided to the fixed surveillance box 102 via a cord 118 and/or an adaptor 120. The cord 118 may be a form of extension cord or could be a custom designed cord with, but not limited to, a specific gauge of wire, length, or other electrical conductivity requirements. The adaptor 120 would allow for the possibility of different voltages, as well as providing for the ability to use different types and forms of power cables to a primary power source (not shown). Power sources for the fixed surveillance box 102, are, but not limited to, direct AC voltage from power lines, standard 120V (110V) or 240V (220V) AC or 12, 24, or 48V DC electrical plugs and/or outlets and/or outlets, solar power, battery power, wind power, generator power, water generated power, fuel cells, renewable power sources, green energy sources, or any combination thereof. Because the fixed surveillance box can be placed in, various locations that could be remote from any direct source of power, alternative powers sources must also be considered. In addition to the various sources described above other considerations must also be taken into account such as, but not limited to, the weather where the fixed surveillance box 102 would be utilized also must be considered as a primarily cloudy location would not benefit from solar power but might possibly benefit from the use of wind or water assisted power generation.

The rearward or back surface 121 of the fixed surveillance box 102 can be, but is not required to be, one of the surfaces that the mounting bracket 122 would be placed upon. The mounting bracket 122 allows for the securing straps 124A and 124B (collectively 124) to be connected to the fixed surveillance box 102. The mounting bracket 122 may be attached to the fixed surveillance box 102 through a surface such as, but not limited to, welding, fasteners, glues, adhesives, magnetics, or created through a manufacturing process (e.g., metal manipulation, or cutouts, or plastic moldings), or a combination thereof. The securing straps 124 can be utilized to secure or place the fixed surveillance box 102 in a variety of locations. Allowing the fixed surveillance box 102 to be placed in remote locations along buildings and poles 132, such as, but not limited to, light or power poles 132. In alternative embodiments the mounting plate 122 may interface with an attachment plate (not shown) that interconnects with the securing straps 124. The mounting plate to attachment plate interaction could be via a tongue and groove, dovetail, slot and opening, or any form of fastener or adhesives.

FIG. 1B is an upper perspective view 100B of the fixed surveillance box 102. The fixed surveillance box 102 has a vertical (side) surface 103 that corresponds to the side of the fixed surveillance box 102. The vertical surface 103 can be comprised of right angles, as well as curved angles dependent upon the desired design requirements. The vertical (side) surfaces 103 may also be comprised of multiples sides, i.e., if the fixed surveillance box 102 is in a rectangle shape there can be 4 vertical surfaces, that can include, but is not limited to, 3 straight or linear sides, and also a curved side, or any combination thereof by way of example.

In addition, the vertical (side) surface 103, can be extended utilizing the side mounting bar (not shown) (mirrored or offset on both sides) and front mounting bar (not shown). The front surface 107 of the fixed surveillance box 102 is a vertical surface that may be curved, or flat depending on the design chosen for the location of use. The front surface 107 can also be a location for various emblems, logos, or graphics 128 to be placed. The mounting bars can be utilized with a fastener (not shown) (i.e., a threaded bolt, or screw), and an attachment fastener (not shown) (i.e., a nut or wingnut) (shown in FIG. 1A). The mounting bars allow for the adjustment of internal components and plates (not shown) in an embodiment of the fixed surveillance box 102 that has a non-adjustable outer size. Alternatively, the side mounting bar and front mounting bar, in combination with the attachment fasteners, and the fasteners could in an adjustable outer size version of the fixed surveillance box 102 to allow for the adjustment of the outer and internal size of the fixed surveillance box 102. For example, the lower portion of the fixed surveillance box 102 could be lowered from upper portion of the fixed surveillance box 102 to increase by approximately double the internal and external size of the fixed surveillance box 102 wherein two separate vertical surfaces 103 and rear surface 121 fit one inside of the other (not shown). The lower portion of the fixed surveillance box 102 could be a set of vertical walls (vertical surface 103 and rear surface 121) and a bottom of the fixed surveillance box 102, while the upper portion of the fixed surveillance box 102 could include the top and a set of vertical walls (a second set of vertical surface 103 and rear surface 121) of the fixed surveillance box 102. Securing straps 124A and 124B and other securing mechanisms allow the fixed surveillance box 102 to be secured to any number of poles, buildings, or other structures 132.

The removable upper plate or top 110 of the fixed surveillance box 102 can be a fixed or removable feature of the fixed surveillance box 102. In alternative embodiments of the present disclosure, the removable portion of the upper plate or top 110 may be comprised of less that the whole upper plate or top as illustrated in FIG. 1B. The upper plate or top 110 can be secured by fasteners 126A, 126B, 126C, 126D (not shown), or 126E (not shown) (collectively 126), but it should be noted that upper plate or top 110 may be secured to the fixed surveillance box 102 with one or more of fasteners 126 or other fastening component such as, but not limited to, glues, structural designs, adhesives, Velcro®, wire, welding, thread, elastic materials, plastics, or combinations thereof. The handle 108 provides a person seeking to open the fixed surveillance box 102 or a person wanting to carry the fixed surveillance box 102 with the easy and ability to do so.

The opening cover 106 allows the fixed surveillance box 102 to be utilized in a variety of locations, many that require different vantage points for surveillance. For example, imagine that you need to monitor the Las Vegas strip. The person or company tasked with this operation would want to not only monitor the streets, alleys, and walkways, but in light of the horrific tragedy that struck in October of 2017 those tasked with surveillance would also want to monitor elevated locations which cannot be done with traditional surveillance systems. Alternatively, the opening cover 106 may also be a flat cover that does not rise above the surface of the upper plate or top 110, or could also be eliminated in certain designs. However, other advantages of the opening cover 106 include the ability to provide a location for antennas to be placed and increase the ability of the fixed surveillance box 102 to communicate surveillance images. In alternative embodiments, a narrow band or beam antenna(s) can be utilized to extend the range of the fixed surveillance box 102 based on its mounting location. It should be noted that in alternative embodiments, forms of Edge Recording, modified, delayed recording or transmission of video and/or still images generated by the imaging system are possible. In an alternative embodiment the imaging system may transmit a portion or all of the imaging acquired via an image or transmittable signal, recorded or stored, to another local fixed surveillance box via a network connection, and that fixed surveillance box then transmits the acquired, recorded, captured, or stored imaging to a command center along with its own acquired, recorded, captured, or stored imaging. Alternatively, the fixed surveillance box may transmit the acquired, recorded, captured, or stored imaging via a wireless network connection such as, but not limited to, a cellular network, or the transmission of those acquired, recorded, captured, or stored imaging signals from some period of seconds or minutes before and/or after a triggering even such as, but not limited to, a line break sensor, a motion sensor or an audio/shot detection sensor.

Figure 2:
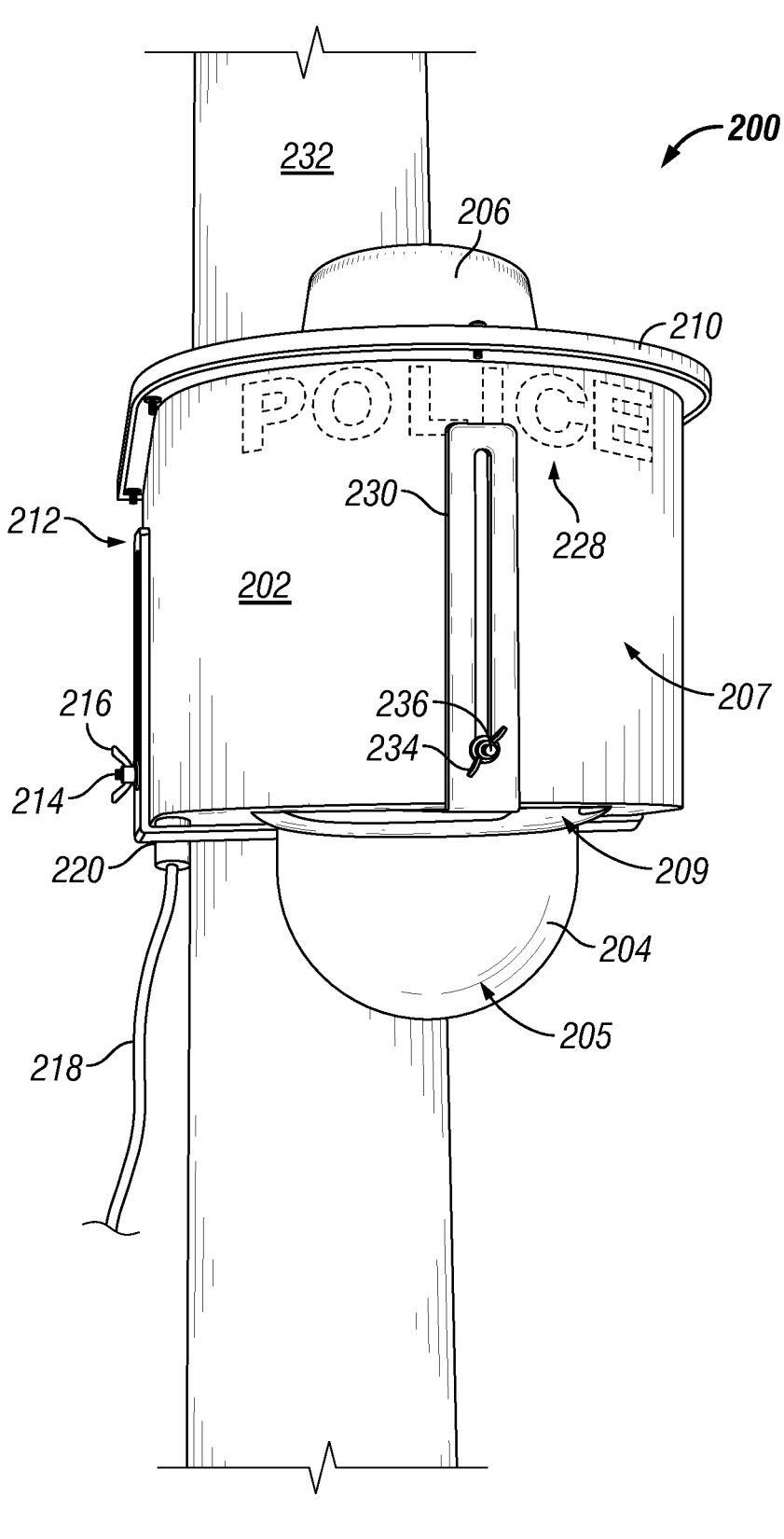
FIG. 2 is a front view of a fixed surveillance box.

FIG. 2 is a front view 200 of the fixed surveillance box 202. The fixed surveillance box 202 provides those seeking to monitor a wide area with the ability to do so and with relative ease. The fixed surveillance box 202 allows an imaging system 204 to be utilized in 360 degrees of operational viewing, and with a variety of imaging options. For example, the imaging system 204 may include, but is not limited to, low and/or high resolution cameras or sensors, night vision, infrared, higher or large magnification, or combinations thereof. The imaging system 104 may also include, but is not limited to, motion sensors, weather related sensors such as temperature, humidity, wind, photocell, sound, microphones, line break sensors, and any combination thereof.

The imaging system 204 can be held in place by a combination of protective cover 205 and/or a containment ring 209. The protective cover 205 allow the imaging system the flexibility to be placed in a secured manner or in a motorized imaging system 204 allows for the rotational flexibility to cover an entire 360 degrees of view, while also providing a protective shield against weather, nature, animals, or vandalism. The containment ring 209 can be placed externally or internally within the fixed surveillance box 202. To provide the imaging system 204, and protective cover 205 with a fixed location the containment ring 209 allows the imaging system 204 and protective cover 205 to rest or be secured in an opening along the lower surface of the fixed surveillance box 202 or other locations on or within the fixed surveillance box 202.

It should be noted that in alternative embodiments of the fixed surveillance box the protective cover 205, and the containment ring 209 may be a part of a camera or imaging system and not a required separate component, and can be incorporated in a manner similar to that described. The containment ring 209 can be affixed to the fixed surveillance box 202 through fasteners, adhesives, connectors, physical structure (i.e., twist and lock), or other locking or securing mechanisms, or combinations thereof. In alternative embodiments of the present disclosure the containment ring 209 would also allow the protective covering 205 to also be secured through the same methods utilized to affix the containment ring 209 to the fixed surveillance box 202.

The fixed surveillance box 202 has many surfaces, and as seen in the front view 200 the front surface 207, as well as the other surfaces of the fixed surveillance box 202 may also have logos, advertisements, graphics, images or designs 228 placed on them. In a world that is becoming increasingly concerned with surveillance and privacy, these logos, advertisements, graphics, images or designs 228 allows those conducting surveillance to notify the public as to who is monitoring them. In the case of law enforcement, the logos, advertisements, graphics, images or designs 228 may also act as a deterrent in areas that are monitored as criminals might think twice before committing acts that would be captured on camera.

The upright or vertical surfaces of the fixed surveillance box 202 can in some embodiments be increased or decreased via the side mounting bars (can be mirrored on both sides of the fixed surveillance box) 212 and front mounting bar 230, that can be interconnected (in a fixed or removable connection) with the fixed surveillance box 202, via the fasteners 214, and 236, and the attachment fasteners 216 and 234. In alternative embodiments of the present disclosure the mounting bars 212 and 230, along with the fasteners 214, and 236, and the attachment fasteners 216 and 234 provide the ability to adjust internal features of the fixed surveillance box 202, such as but not limited to, the imaging system 204, or antennas or other structural components, such as, but not limited to, shelves, protection bars, of combinations thereof.

The upper plate or top 210 of the fixed surveillance box 202 allows the system to be used in a variety of manners. As the upper plate or top 210 can be secured, or removably connected to the fixed surveillance box, in whole or in part. In addition, the upper plate or top 210 can also have an opening cover 206 that can be centered or offset to one side or forwards or backwards in relation to the front of the fixed surveillance box 202 depending on the location of the fixed surveillance box 202. For example, when attached to a pole or other location 232, the imaging system 204 may need to be offset along the lower surface of the fixed surveillance box 202, while an upper imaging system placed in the area protected by the opening cover 206 may need to be offset the opposite direction of the imaging system 204 in this example. Similarly, the adaptor 220 and cord 218 may be placed on any of the surfaces, not just the lower surface of the fixed surveillance box 202 as shown in FIG. 2.

Figure 3:
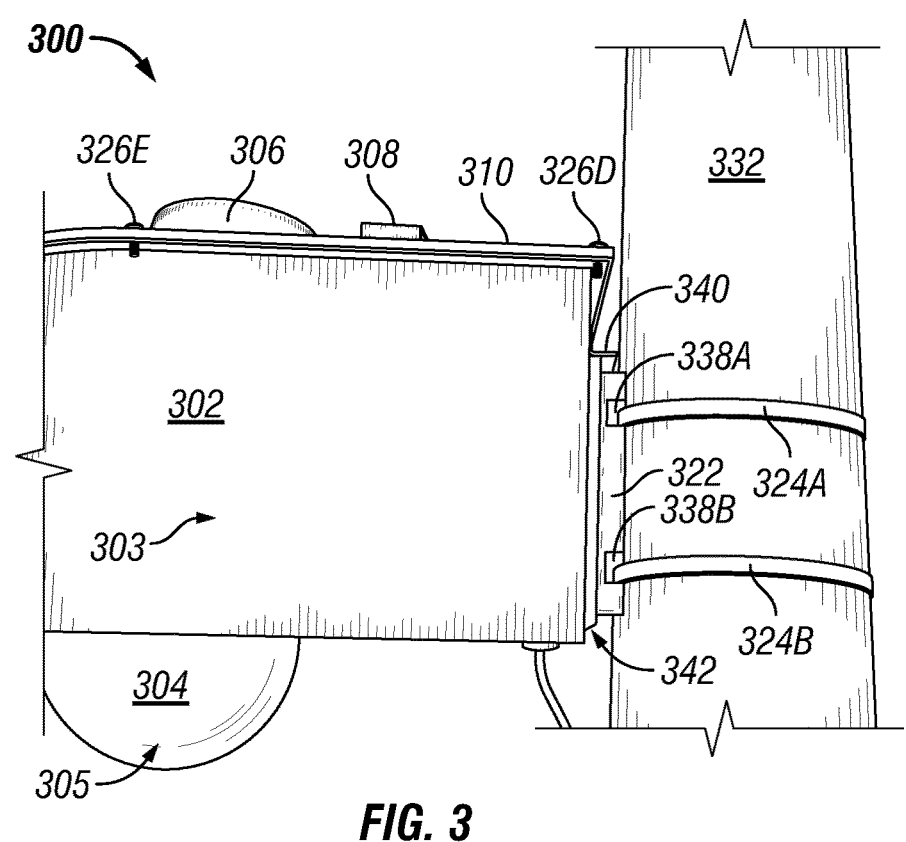
FIG. 3 is a side view of a fixed surveillance box.

FIG. 3 provides a side view 300 of the fixed surveillance box 302. The imaging system 304, and protective cover 305, can be placed in any number of positions or locations on or within the fixed surveillance box 302. The vertical side surfaces 303 can be directly connected or removably connected to the bottom surface (not shown), or the upper plate or top 310. The upper plate or top 310 is shown to be removably connected to the fixed surveillance box 302, and/or the vertical side surfaces 303 via the fasteners 326D, 326E (collectively 326, as 326A, 326B and 326 C are not shown), it would be understood that the number of fasteners could vary depending on the location of the fixed surveillance box 302, the desired retention level, or additional considerations. The upper plate or top 310 also allows for the fixed surveillance box 302 to have a handle 308, as well as the opening cover 306. The mounting bar (not shown) that can be affixed or removably connected to the vertical side surface 303 or bottom surface (not shown) through a fastener (not shown) and fastener attachment (not shown). This allows for the adjustment of the vertical side surfaces or the internal structural components depending on the desired elements.

The fixed surveillance box 302 is designed to be mounted in a variety of locations, including but not limited to polls, light posts, telephone poles, electrical poles, power poles, buildings, trestles, overhangs, gutters, and any other locations 332 capable of supporting the fixed surveillance box 302. In some locations, a specific offset is required in order to provide the optimum distance from the pole or other structure 332 that the fixed surveillance box 302 is mounted to. The optimum distance can be maintained via an offset bracket 340, that is typically in an substantially right angle or L shape, wherein the width and height may be such that they are equal or non-equal depending on the desired offset. The offset bracket 340 may be attached to the fixed surveillance box 302 via welding, adhesives, tape, Velcro®, or fasteners, or may also be manufactured directly into the rear or back surface (not shown). The fixed surveillance box 302 also has an offset plate 342. The offset plate 342 can be attached to the fixed surveillance box 302 via welding, adhesives, tape, Velcro®, or fasteners, or may also be manufactured directly into the rear or back surface (not shown). To achieve the desired tension or securing force a desired amount of offset may be required. The offset plate 342 can also be connected or attached to the securing or mounting plate 322. The mounting plate 322 has two strap openings 338A and 338B, for the securing straps 324A and 324B. It should be noted that the number of strap openings and securing straps can vary from none to many different straps or strap combinations depending on the securing location. The mounting plate 322, can be attached to the fixed surveillance box 302 or offset plate 342 via welding, adhesives, tape, Velcro®, or fasteners, or may also be manufactured directly into the rear or back surface (not shown) or cast as a part of a cast box.

Figure 4A:
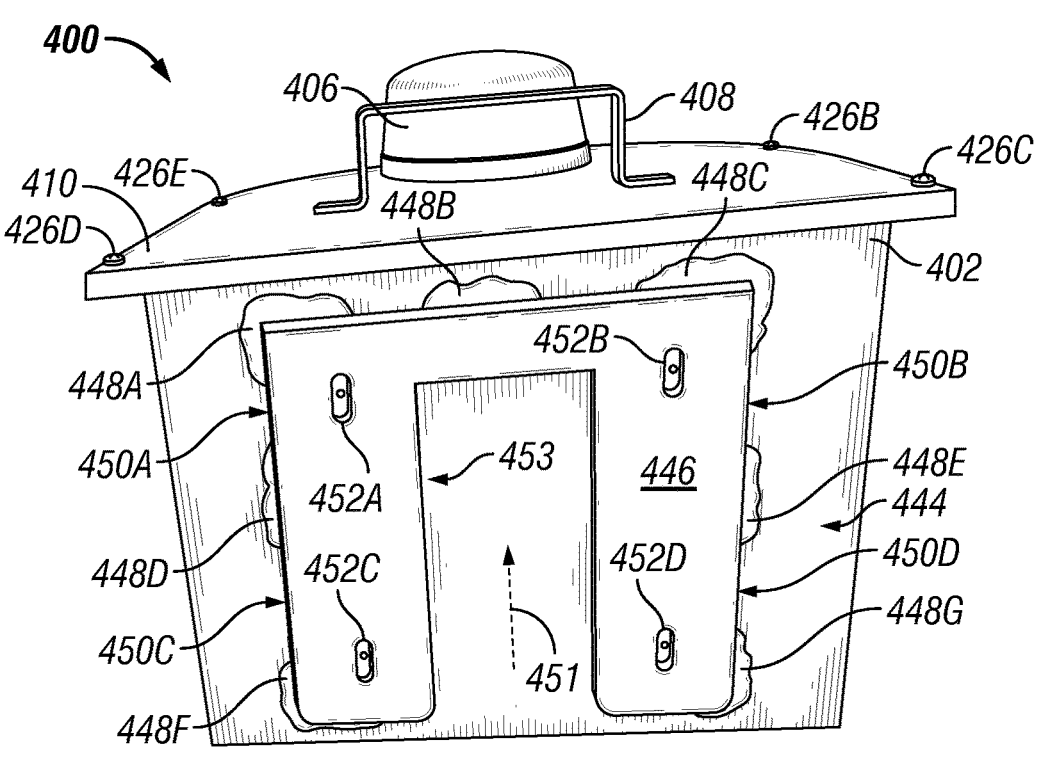
FIG. 4A is a rear view of a fixed surveillance box without attachment straps.

FIG. 4A is a rear view 400A of a fixed surveillance box 402 without attachment straps. The rear view 400 shows the removably connected upper plate or top 410, with a handle 408 and opening cover 406, along with the fasteners 426B, 426C, 426D, and 426E (collectively 426). It would be understood that the number of fasteners could vary depending on the location of the fixed surveillance box 302, the desired retention level, or additional considerations. The rear vertical surface 444 of the fixed surveillance box 402 allows for the securing or attachment of the fixed surveillance box 402 to any number of locations. A mounting plate 446 can be affixed to the rear vertical surface 444 via welding points (collectively 448) or other method of affixing, including but not limited to, adhesives, tape, Velcro®, or fasteners, or may also be manufactured directly into the rear vertical or back surface 444. A plurality of strap openings 450A, 450B, 450C, and 450D (collectively 450), are not limited to only the number of openings shown. The strap openings 450 allow for a securing strap (not shown) to be connected or attached to the fixed surveillance box 402 and to any number of locations where the fixed surveillance boxes will be utilized.

The mounting plate 446 also has fastening points (collectively 452), that can be utilized to secure the mounting plate 446 to the fixed surveillance box 402 or in alternative embodiments, can be utilized as fastener points to attaching the fixed surveillance box 402 to a fixed attachment plate. For example, a fixed attachment plate could be secured to a building and fixed surveillance box utilizing the mounting plate with fastener points could then be affixed to the building through the mutual connection. The mounting plate 446 can also have a void or space 453 between it and the rear vertical or back surface 444 of the fixed surveillance box 402. The void or space 453 allows for the attachment plate (not shown) and securing straps (not shown) to be slide or placed within the void or space area in a secure or attaching manner. This allows for many locations to be outfitted the attachment plate (not shown) and securing straps (not shown), and then the fixed surveillance box 402 can be moved to this locations with relative ease.

Figure 4B:
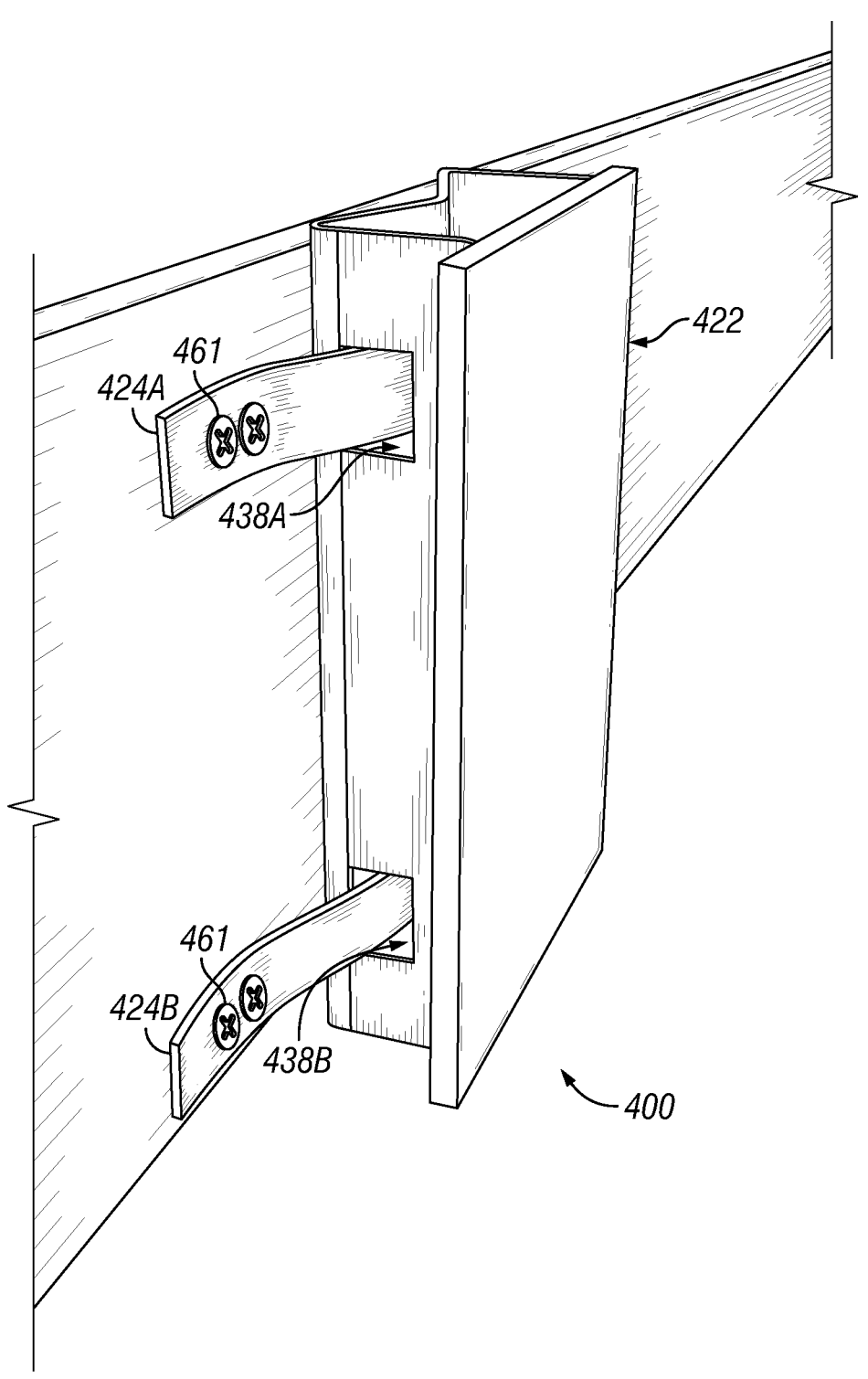
FIG. 4B is a perspective view of a mounting plate for mounting a fixed surveillance box to a pole or other location.
Figure 4C:
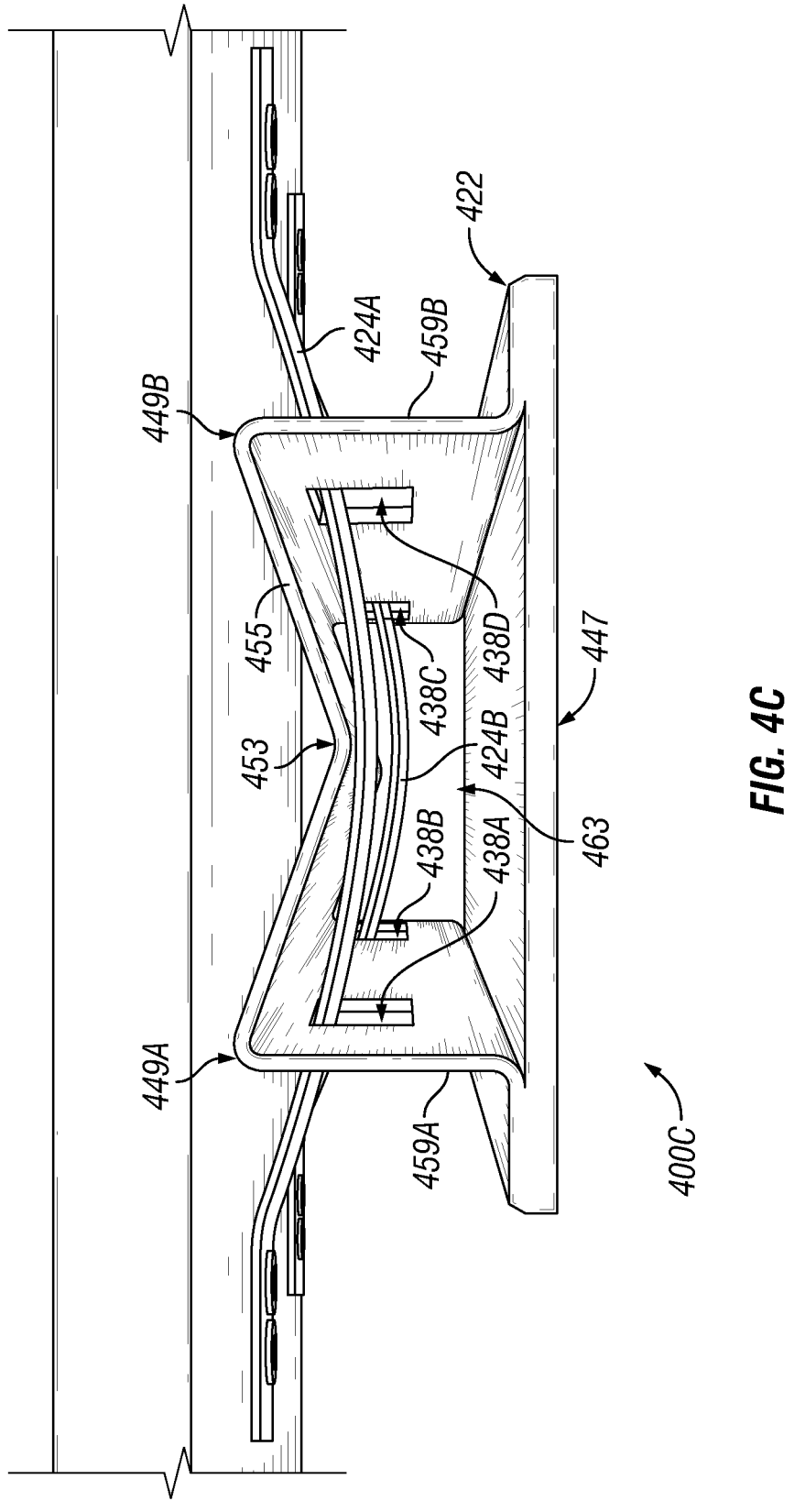
FIG. 4C is a top view of a mounting plate for mounting a fixed surveillance box to a pole or other location.

FIG. 4B is a perspective view 400B and FIG. 4C is a top view 400C of the attachment plate 422, and the securing straps 424A and 424B (collectively 424) in a mounted manner. The attachment plate 422 can have a plate, flat or straight surface 447 that can be placed within a void or space on one of the many surfaces of the fixed surveillance box in order to secure or attach the fixed surveillance box to a pole or other location. The attachment plate 422 can have attached via a welding, as well as metal or plastic casting, molding, glues, adhesives, fasteners or any combination thereof, sides 459A and/or 459B (collectively 459) and/or rear plate 455. The rear plate 455 can have a bend, or indention 453 that allows or the attachment plate to be secured more easily to a pole or other variable surface profile location. The rear plate 455 may also include to corners or points 449A and/or 449B (collectively 449) that would allow the rear plate 455 and the attachment plate 422 to rest and/or be secured against a flat or variable surface profile location.

The sides 459 may also have openings 438A, 438B, 438C, and/or 438D (collectedly 438) that would allow for the securing straps 424 to be placed through the attachment plate 422. The securing straps 424 can also be secured to the surface of a mounting location through fasteners 461, adhesives, glues, additional straps, and/or other securing means or any combination thereof. These straps may also be secured to the attachment plate 422, or within the attachment plate void 463 in alternative embodiments, or to the sides 459 or rear plate 455.

Figure 5A:
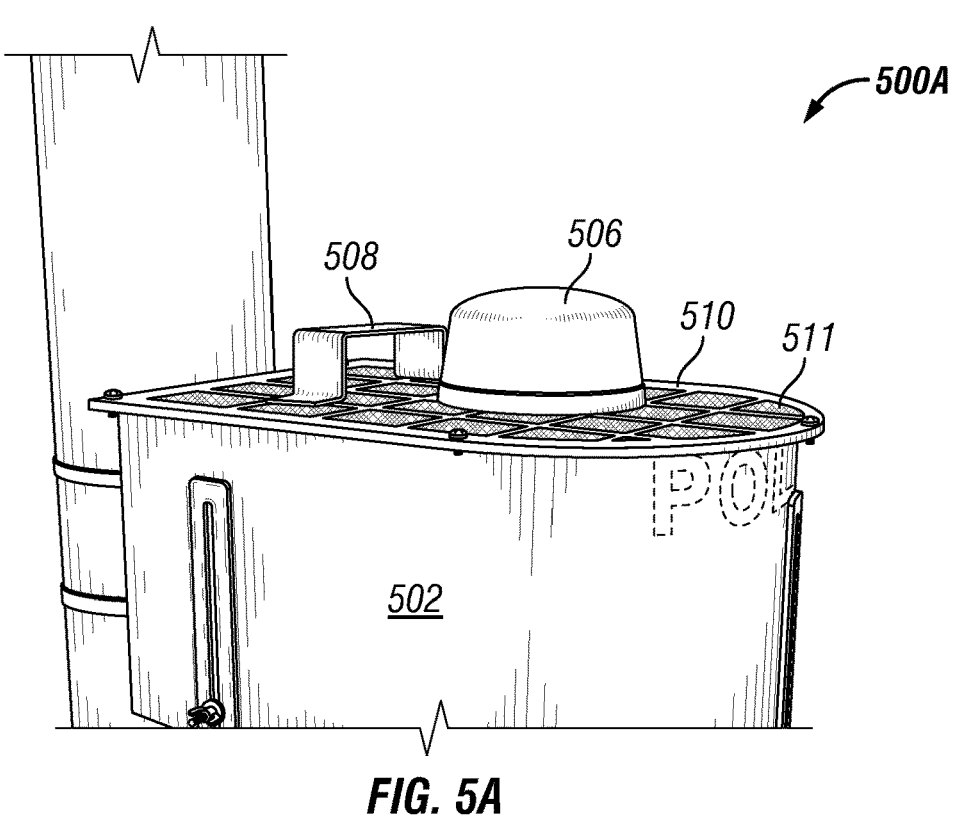
FIG. 5A is a top view of the fixed surveillance box with a solar panel.

FIG. 5A is a top view 500A of the fixed surveillance box 502 with an alternative power source that includes solar panels 511. The upper plate or top 510 of the fixed surveillance box 502 is covered with solar panels 511 in order to provide an alternative power source that would allow the fixed surveillance box 502 to be used in remote locations, such as, but not limited to, on an oil or natural gas well drilling site. In addition to the upper plate or top 510 being covered with solar panels 511, the handle 508 and the opening cover 506 could also be covered or made of solar panel materials.

Figure 5B:
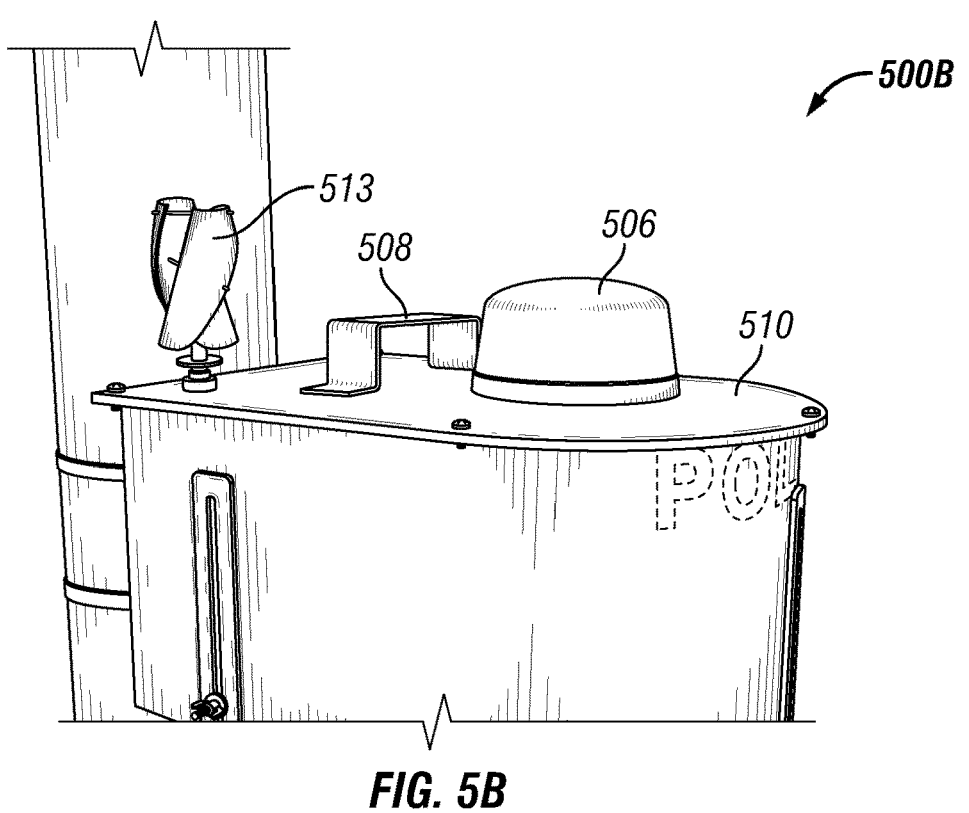
FIG. 5B is a top view of the fixed surveillance box with a wind turbine.

FIG. 5B is a top view 500B of the fixed surveillance box 502 with a wind turbine 513. The wind turbine 513 would provide an alternative power source that would allow the fixed surveillance box 502 to be used in remote locations, such as, but not limited to, on an oil or natural gas well drilling site or at remote building sites. The wind turbine 513 could also be placed on the handle 508 or the opening cover 506 to get it higher or better location to receive sufficient wind or force to generate power.

Figure 6:
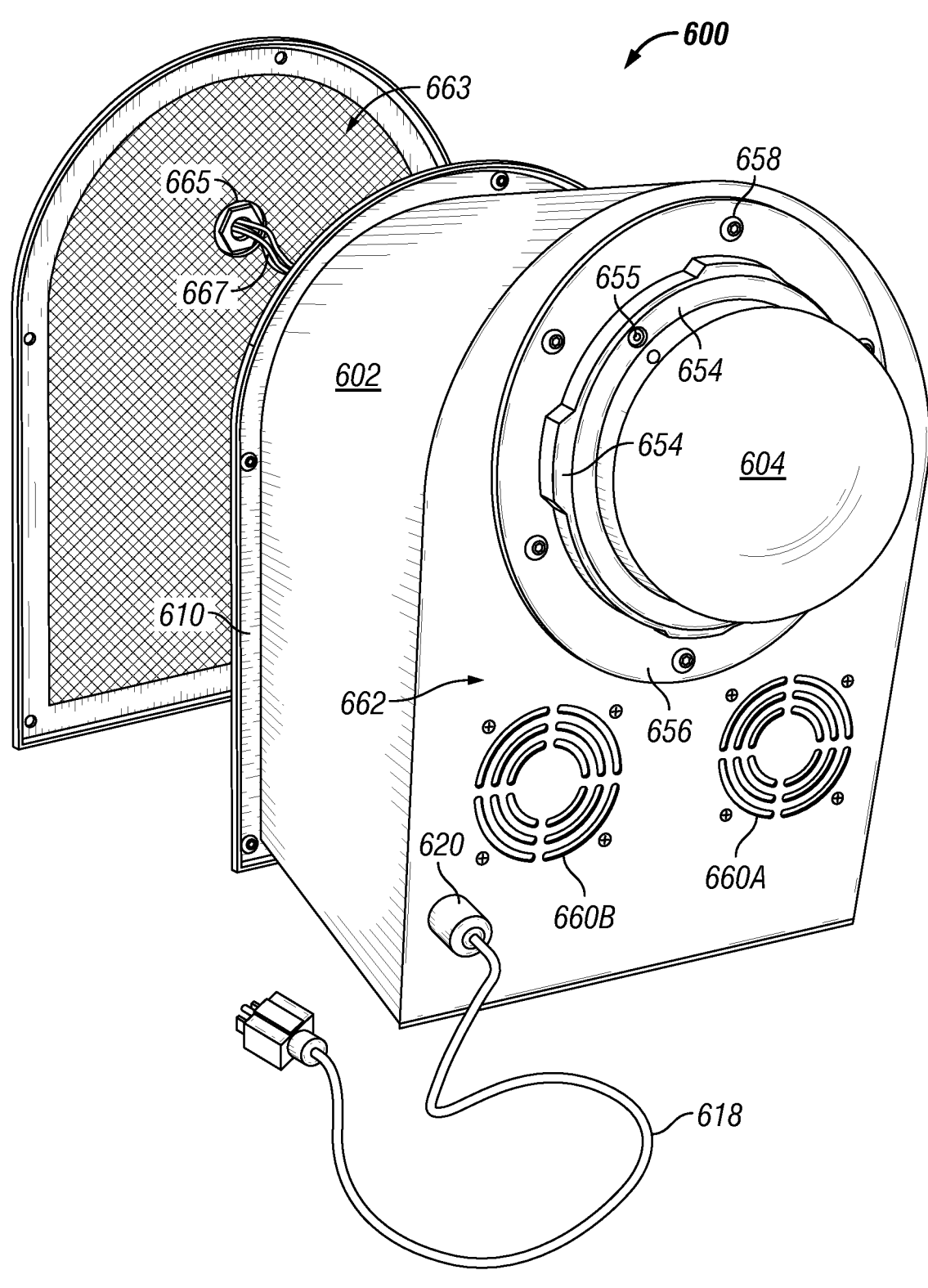
FIG. 6 is a bottom view of a fixed surveillance box.

FIG. 6 is a bottom view 600 of a fixed surveillance box 602. The fixed surveillance box 602 has a bottom surface 662 that is typically but not always smaller than the whole of the upper plate or top 610. The bottom surface 662 has a variety of openings, including but not limited to, power plugs, fan openings, openings for camera(s) and other openings that can be utilized for any number of purposes. The power plugs allow for the adaptor 620 and the cord 618 to be utilized for power supply to, but not limited to, the various camera components, processors, memory, buses, and/or switches. The openings for camera(s) can have, but not limited to, a securing ring 656, a locking ring 654, that allow for the camera to be replaced or transitioned with relative ease. It should be noted that the securing ring 656 and locking ring 654 are not required, but based on different camera or imaging systems utilized may be necessary to provide a secure and weather resistant housing for the camera or imaging systems. In alternative embodiments, the locking ring or securing ring could also be a component or piece of the camera or imaging system rather than the fixed surveillance box. The securing ring can be utilized internally or externally of the fixed surveillance box 602, shown here in an external format. The securing ring 656 is secured to the fixed surveillance box 602 or bottom surface 662 through fasteners (collectively 658). The locking ring 654 allows for the camera system 604 to be secured to or within the fixed surveillance box 602. The locking ring 654 can interface with the securing ring 656 in, but not limited to, a lock and turn manner or through, but not limited to securing pins 655.

Additionally, because of the electronic equipment necessary to operate a camera surveillance system, fans and openings to vent said fans are needed. The openings illustrated, but not limited to, fan openings 660A and 660B allow for at least one fan to be utilized if needed within the fixed surveillance box 602. In alternative embodiments, fans may not be required due to the geographical location where the box will be utilized. For example, a fixed surveillance box utilized in Maine would likely not need fan(s) or fan opening(s) while a fixed surveillance box utilized in Arizona would likely need several fan(s) and/or fan opening(s) in order to maintain a stable operating environment for the imaging system. The top or upper plate 610 can also have a protective or insulating material 663 that can assist in maintaining a safe or efficient operating temperature within the fixed surveillance box 602. In alternative embodiments, there may also be an opening 665 in the top or upper plate 610 that allows for an antenna or other communications system to be placed outside the internal structure of the fixed surveillance box 602. The antenna or other communications system to other communications outputs, inputs, transceivers, receivers, or transmitters via a wire or cable 667.

Figure 7:
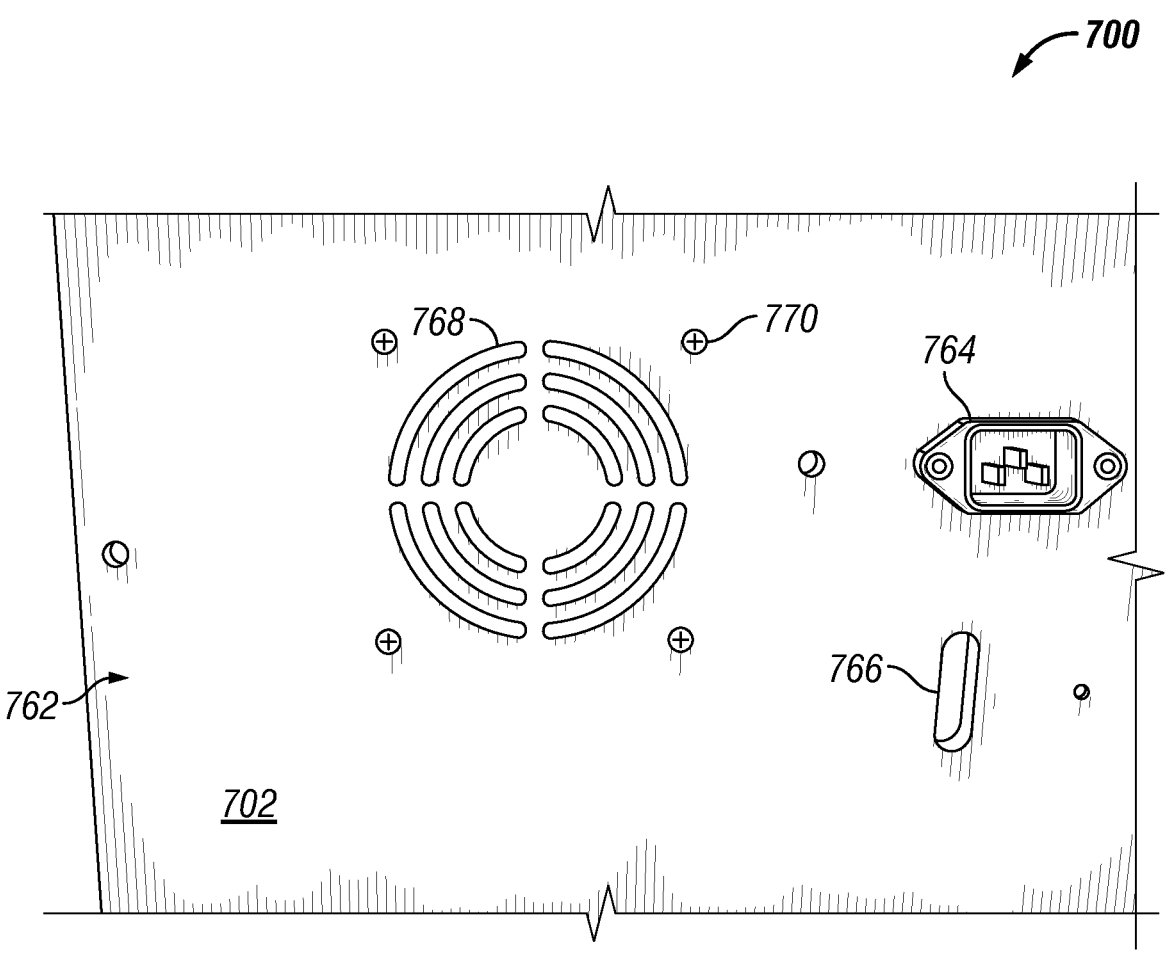
FIG. 7 is a cutaway view of the bottom of a fixed surveillance box.

FIG. 7 is a cutaway view 700 of the bottom surface 762 of a fixed surveillance box 702. The fan opening 768, working in conjunction with a fan system (not shown) that is removably affixed within the fixed surveillance box 702. The fan system (not shown) is removably affixed via fasteners 770, which can be placed through the bottom surface 762 of the fixed surveillance box 702. Illustrated is also a power plug 764 that allows the adaptor and cord (not shown) to connect the fixed surveillance box 702 to a power source. There is also the opening 766 that can be utilized for many different purposes. Those purposes can include, but are not limited to, vent opening, lock or key opening, opening to reset electronic components, including but not limited to camera systems, processors, memory, storage, buses or other components. The opening 766 could also be utilized for at least one sensor, or a multitude or plurality of sensors, such as, but not limited to, License Plate Recognition ("LPR"), stop or red light violation detection, and/or speeding violation detection, motion sensors or detectors, radar or speed detection sensors, LPR reader(s), line detection, face detection, weather related sensors such as temperature, humidity, wind, photocell, shot or audio capture (microphone), and/or infrared light projection, laser tripwire or other forms of analog or digital trip or line break sensors, or any combination thereof. For example, in a situation such as a shooting the fixed surveillance box utilizing at least one shot, audio or microphone sensor to detect a shot could network with other fixed surveillance boxes or utilize a plurality of shot, audio or microphone sensors within or attached to the fixed surveillance box to triangulate the shot. Additionally, in alternative embodiments if a shot or other audible source that would trigger a monitoring of events, the fixed surveillance system could activate a LPR reader for all movement from the source or location of the sound. Allowing law enforcement to have additional sources of evidence and information in a time of crisis. As can be seen the opening 766 along with other openings of the fixed surveillance box would allow for at least one sensor to provide additional data that can be gathered, acquired, captured, and/or transmitted, stored, or disseminated to any number on monitoring stations or storage devices or media storage devices.

Figure 8:
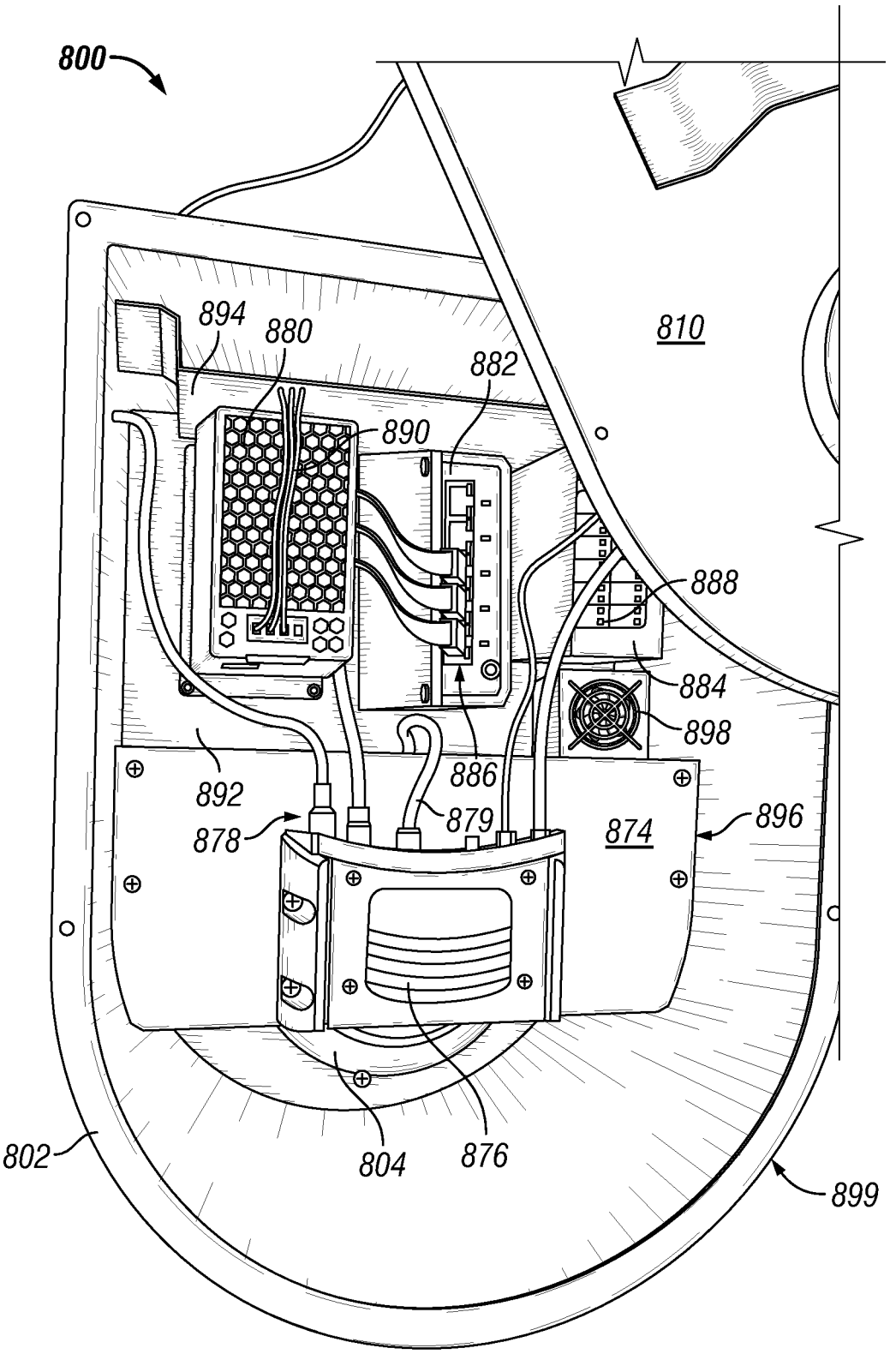
FIG. 8 is an internal view of a fixed surveillance box.

FIG. 8 is an internal view 800 of a fixed surveillance box 802. The camera system 804 has many additional pieces that allow it to operate at peak efficiency. Some of these pieces include a processor 876, that may also include, but is not limited to, a processor for controlling the camera, or function of the camera, a memory, volatile memory, non-volatile memory, hard disk storage, removable disk storage, communication buses, operation buses, switches, connectors, or power devices. The present disclosure may also comprise a computing device that can include any of an application specific integrated circuit (ASIC), a microprocessor, a microcontroller, a digital signal processor (DSP), a field-programmable gate array (FPGA), or equivalent discrete or integrated logic circuitry. In some examples, the system may include multiple components, such as any combination of one or more microprocessors, one or more microcontrollers, one or more DSPs, one or more ASICs, or one or more FPGAs. It would also be understood that multiples of the circuits, processors, or controllers could be used in combination or in tandem, or multithreading.

The components of the present disclosure may include any discrete and/or integrated electronic circuit components that implement analog and/or digital circuits capable of producing the functions attributed to the modules herein. For example, the components may include analog circuits, e.g., amplification circuits, filtering circuits, and/or other signal conditioning circuits. The components may also include digital circuits, e.g., combinational or sequential logic circuits, memory devices, etc. Furthermore, the modules may comprise memory that may include computer-readable instructions that, when executed cause the modules to perform various functions attributed to the modules herein. Memory may include any volatile, non-volatile, magnetic, or electrical media, such as a random access memory (RAM), read-only memory (ROM), non-volatile RAM (NVRAM), electrically-erasable programmable ROM (EEPROM), flash memory, hard disks, or any other digital media.

It would be understood that processor 876 could also encompass the use of multiple processors operating in tandem or multi-threading to perform, communicate, or otherwise complete operations. The processor 876 is connected with a power supply 880, a network switch 882, and/or a communication bus 884, through wires or connections 878. The processor 876 or power supply 880 or other sensor or component may also provide a connection to or control to a fan 898 that can assist in maintaining a proper operating environment for the various components.

The power supply 880 provides dedicated power to those elements requiring power within the fixed surveillance box 802. The power supply is connected to the plug (not shown) and to the elements requiring power, through the wires 890. These wires 890 can be a varying size and resistance. The power supply could also include a power conditioner to protect and condition the incoming power for the many possible sensitive electronic components. The network switch 882 provides the network connections to the various surveillance networks, and the individuals that monitor said surveillance networks. The network switch 882 can also provide a hardwire, wired, or wireless connection or network connection point for the various components through network cables 886, which can include but are not limited to CAT5, CAT5e, or CAT6 cabling, or other sizes as needed. In addition to the network connections, and a possible network switch, a wireless router or modem can also be included as part of the network connections available with the fixed surveillance box 802. A Bluetooth or other wireless network connection could also be utilized. The network connection can include a transceiver capable of transmitting and/or receiving network signals. The communication bus 884, allows for communications between the various electrical and non-electrical pieces of the fixed surveillance box 802, as well as providing a point to allow various signals to be converted or switched 888 between other signal or signal protocols or coding format. For example, a video signal from a camera may require that the video be converted from an .mpg to an .mp4 coding prior to transmission or storage. The communication bus 884, in combination with its switching and converting capabilities 888 can complete this conversion.

The processor 876 or other internal components can rest on the adjustable shelf 874. In alternative embodiments, the shelf 874 can be a fixed or non-adjustable component. There can also be a bracket 896 that can allow the adjustable shelf 874 to be moved and adjusted via the mounting bars (not shown). It should be noted that there could be multiples of the adjustable shelf, to allow for additional components and imaging systems to be properly mounted. To provide additional structural support, and prevent movement of pieces during moving or installation there can also be a protection bar 894. The protection bar 894 can be placed against the sides or against the bottom 892 of the internal portion of the fixed surveillance box 802. The location and position of the protection bar 894 can be varied upon the needs or requirements based on the size and structure of the pieces and components used within the fixed surveillance box 802. The protection bar 894 can in alternative embodiments be utilized as a mounting plate and/or mounting point for any of the internal components of the fixed surveillance box 802.

The upper plate or top 810, along with a lip 899 that can provide support and a connection point for a fastener to removably connect the upper plate or top 810 with the fixed surveillance box 802.

Figure 9:
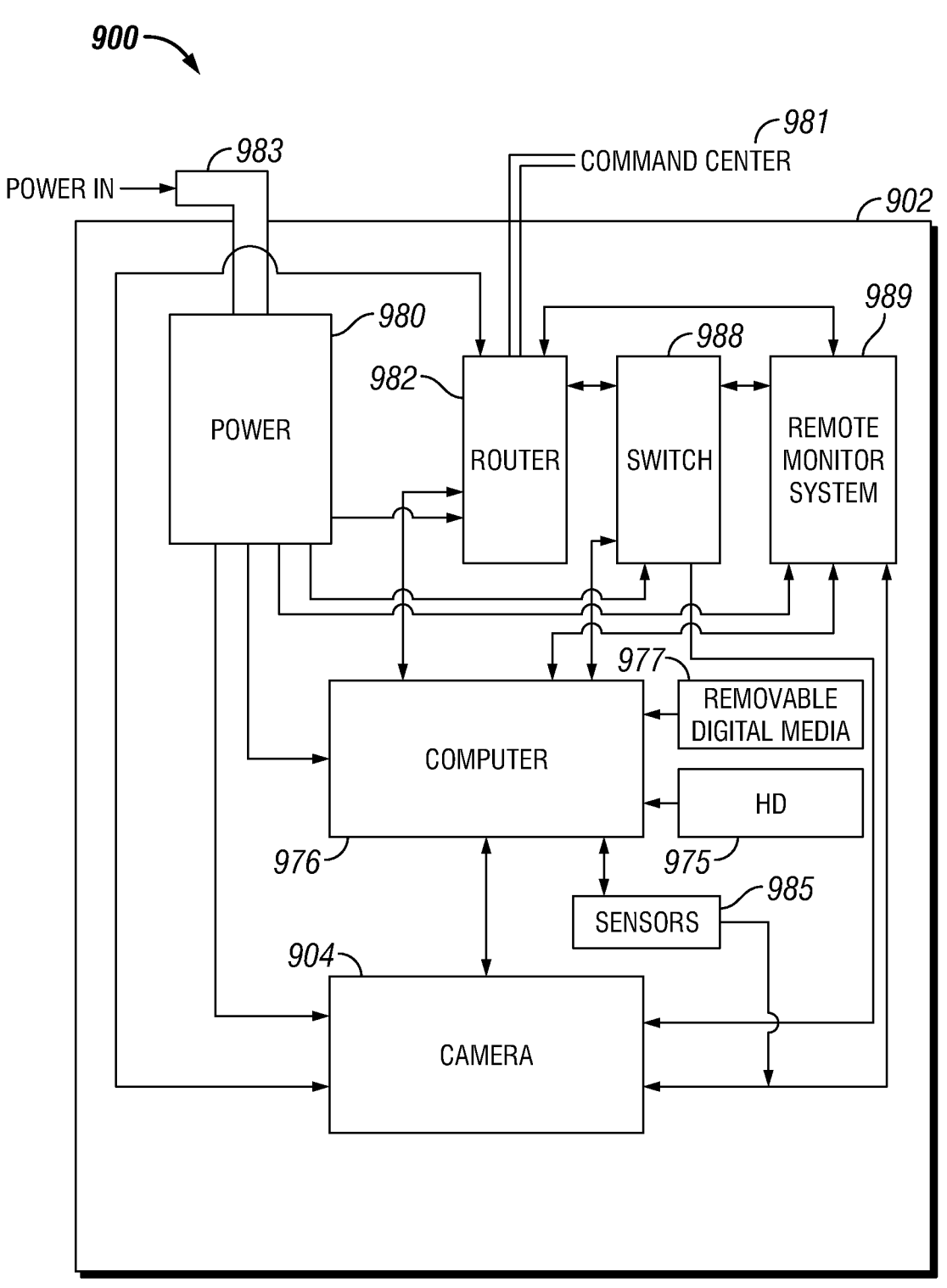
FIG. 9 is a system diagram of the electronic components of a fixed surveillance box.

FIG. 9 is a system diagram 900 of the fixed surveillance box 902. It should be noted that many of the connections shown are for illustration purposes and are not the only connection point possible. Power for the electronic components can be provided via the power in 983 that can come from any number of sources including but not limited to, renewable energy, wind solar, AC, DC, battery, fuel cell, and other forms of power or energy generation sources, or any combination thereof. The power in 983 provides the power to the power distribution box 980. This power distribution box 980 may also include a power condition system, power converters (including but not limited step-up and step-down converters, transformers, boost, buck and/or any combination thereof), power storage (including but not limited to batteries, fuel cells, capacitors, super capacitors, battery-capacitor hybrids, and/or any combination thereof), backup systems that can include power or energy storage devices, and power distribution systems that may include power converter devices, and/or any combination thereof. Power can then be provided to any of the electronic or other devices that may require it for operation.

The router 982 can accept incoming wired and wireless networking or communication signals. These wired and wireless signals can include such devices and communications such as but not limited to wired or wireless communications from a command center 981 or a Wi-Fi or mess network, or cellular network, or other communications protocol or any combination thereof. The router 982 can include, but is not limited to also having a modem, network switch, signal conditioning, signal conversion systems, media or digital storage devices, memory devices, disc storage, and/or signal management systems, or any combination thereof. The router may be connected directly or through indirectly through other devices such as a switch 988 to any of the other network or communication system connected devices or components of the fixed surveillance box 902.

The switch 988 and/or router 982 may also be connected to a remote monitor manager or management system (remote monitor system) 989, in alternative embodiments the remote monitor system 989 may also be connected directly or indirectly to a computer or processor 976. The remote monitor system 989 can allow the fixed surveillance box 902 to control not only the imaging or camera system 904, but also any of the connected sensor systems, such as, but not limited to, License Plate Recognition ("LPR"), stop or red light violation detection, and/or speeding violation detection, motion sensors or detectors, radar or speed detection sensors, LPR reader(s), line detection, face detection, shot or audio capture (microphone), and/or infrared light projection, laser tripwire or other forms of analog or digital trip or line break sensors, weather related sensors, or any combination thereof. The imaging or camera system 904 is capable of outputting an image or transmittable signal via the network connection. The connected sensor systems can also be an external sensor connected to the computing device via the network connection, or through the remote monitor system 989. The sensors are also capable of outputting a sensor signal to the computing device or other receiver via the network connection, or some other form of communication signal.

The remote monitor system 989 may also in alternative embodiments interact with the computer or processor 976 in order to assist in the acquisition, capture, recording, and/or monitoring of the various sensors, and imaging systems within, attached, mounted, or connected to the fixed surveillance box 902. The remote monitor system 904 may also assist in the distribution or transmission via the router 982 and/or switch 988 of the data acquired, captured, recorded, or monitored by the fixed surveillance box 902. Additionally, the remote monitor system 904 may also be connected via the router 982 and/or switch 988 to a command center 981 or other communications or monitoring center that can, but is not limited to, adding additional control of acquisition, capture, recording, and/or monitoring sensors 985. The control could include, but is not limited to, adjusting the sensitivity of a sensor, adjust timers, adjusting monitoring times, control updates to the sensors or the fixed surveillance box in general, control the saving operations to a removable digital media or disc or hard drive, control the saving operations to a removable digital media or disc or hard drive based on activation or deactivation signals from one of the various sensors.

The computer or processor 976 can provide a connection to and control of the various sensors, and imaging systems within, attached, mounted, or connected to the fixed surveillance box 902. The computer or processor 976 can be, but is not limited to, connections with the router 982, switch 988, the remote monitor system 989, removable digital media 977, hard drive 975, memory, graphics processors or cards or engines or modules, buses, caches, and/or sensors or imaging systems. The sensors and/or imaging systems connected to the computer or processor 976 may also be transmitted or stored, based on signals from other sensors, or commands from a central command center, or the remote monitor system 989. For example, when a warrant goes out for a specific license plate, the computer may receive a command to begin recording all vehicle license plates that drive past the fixed surveillance box 902 and process them looking for the license plate flagged in the warrant. Upon recording, the license plate passing the fixed surveillance box 902 a location and time stamp could be sent to local or other law enforcement personal in the area via the central command center or an automated command issued from the computer or processor 976.

Another example, the license plates of passing vehicles are recorded, and processed by the computer or processor (and any additional processors or hardware required), the digitally enhanced or processed license plate numbers are then stored on a local or removable digital media or disc or drive for later comparison or upon a request signal can be transmitted to a command center or monitoring station for further data mining. In yet another example, the computer or processor 976 or remote monitor system 989 activates the camera or imaging system 904 based upon a sound, audio or microphone recording a gunshot or similar sound. The camera or imaging system 904 may then also be panned, tilted, and/or zoomed in on the location where the sound originated from. This can allow police to at the very least know the scene of the incident and any casualties or suspects still in the area, and possibly gather additional relevant evidence.

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary of the Invention" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

We claim:

1. A system for securing an object to a securing site comprising:
 at least one strap;
 an attachment plate for placement at a securing site;
 wherein the attachment plate comprising a plate, at least two sides, and a rear plate;
 wherein each of the at least two sides have at least one opening configured to allow the at least one strap to pass through; and
 a mounting plate for placement on the object, wherein the mounting plate is offset from the object by a fixed distance sized to receive the plate of the attachment plate between the mounting plate and the object.

2. The system of claim 1, wherein the at least one strap further comprises at least one fastener for securing the at least one strap to the securing site.

3. The system of claim 1, wherein the rear plate further comprises an indention.

4. The system of claim 1, wherein the rear plate further comprises a bend.

5. The system of claim 1, wherein the plate and the at least two sides are welded together.

6. The system of claim 1, wherein the rear plate and the at least two sides are welded together.

7. The system of claim 1, wherein fixed distance is created by a set of fastening points that secure the mounting plate to the object.

8. The system of claim 1, wherein the mounting plate further comprises at least one strap opening.

9. The system of claim 1, wherein the mounting plate further comprises an offset plate.

10. The system of claim 9, wherein the offset plate is securing to the mounting plate via welding.

11. A device for securing an object to a receiving unit comprising:

a mounting plate for placement on the object, wherein the mounting plate offset from the object by a fixed distance sized to receive a plate of an attachment plate between the mounting plate and the object; and a set of fasteners that couple the mounting plate to the object.

12. The device of claim 11, wherein fixed distance is created by the set of fasteners that secure the mounting plate to the object.

13. The device of claim 11, wherein the mounting plate further comprises at least one strap opening.

14. The device of claim 11, wherein the mounting plate further comprises an offset plate.

15. The device of claim 14, wherein the offset plate is securing to the mounting plate via welding.

16. A device for receiving and securing an object comprising:

an attachment plate for placement at a securing site;

wherein the attachment plate comprising a plate sized to be received in an offset from the object between a mounting plate and the object, at least two sides, and a rear plate; and wherein each of the at least two sides have at least one opening configured to allow at least one strap to pass through; wherein the plate extends beyond the at least two sides and is configured to be received by a securing mechanism.

17. The device of claim 16, wherein the rear plate further comprises an indention.

18. The device of claim 16, wherein the rear plate further comprises a bend.

19. The device of claim 16, wherein the plate and the at least two sides are welded together.

20. The device of claim 16, wherein the rear plate and the at least two sides are welded together.

\* \* \* \* \*